US009599704B2

(12) United States Patent
Mitchell

(10) Patent No.: US 9,599,704 B2
(45) Date of Patent: *Mar. 21, 2017

(54) MARINE RADAR BASED ON CYLINDRICAL ARRAY ANTENNAS WITH OTHER APPLICATIONS

(71) Applicant: MARK Resources, Inc., Torrance, CA (US)

(72) Inventor: Richard L. Mitchell, Palos Verdes, CA (US)

(73) Assignee: MARK Resources, Inc., Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,584

(22) Filed: Apr. 20, 2015

(65) Prior Publication Data

US 2015/0323659 A1 Nov. 12, 2015

Related U.S. Application Data

(63) Continuation-in-part of application No. 14/270,622, filed on May 6, 2014.

(51) Int. Cl.
*G01S 13/66* (2006.01)
*G01S 13/02* (2006.01)
(Continued)

(52) U.S. Cl.
CPC .............. *G01S 13/66* (2013.01); *G01S 7/04* (2013.01); *G01S 7/28* (2013.01); *G01S 13/02* (2013.01);
(Continued)

(58) Field of Classification Search
CPC .. G01S 7/032; G01S 2013/0245; G01S 13/66; G01S 13/0209; G01S 13/9307;
(Continued)

(56) References Cited

U.S. PATENT DOCUMENTS 3,653,057 A * 3/1972 Charlton .................. H01Q 3/40
342/373
4,791,421 A 12/1988 Morse et al.
(Continued)

OTHER PUBLICATIONS

D. E. N. Davies et al. "Cylindrical arrays with electronic beam scanning," in Proceedings of the Institution of Electrical Engineers, vol. 112, No. 3, pp. 497-505, Mar. 1965. doi: 10.1049/piee.1965. 0083.*

(Continued)

*Primary Examiner* — Matthew M Barker
(74) *Attorney, Agent, or Firm* — Blakely Sokoloff Taylor & Zafman LLP

(57) ABSTRACT

An all-solid-state marine radar technology based on a non-rotating cylindrical array antenna is described. Multiple transmit and receive modules are used to form the antenna beam, which allows the beam sequencing, the dwell time in each beam position, the resolution, and the beam shape to be varied in order to make best use of the available energy. Waveforms with a high duty ratio can be used on transmit in order to make efficient use of solid-state power amplifiers. High resolution in both range and Doppler provides high measurement accuracy and superior performance in clutter. Alternate embodiments, including continuous waveform embodiments are disclosed.

29 Claims, 5 Drawing Sheets

(51) Int. Cl.

| | | |
|---|---|---|
| *G01S 13/93* | (2006.01) | |
| *G01S 7/28* | (2006.01) | |
| *G01S 7/04* | (2006.01) | |
| *H01Q 3/26* | (2006.01) | |
| *H01Q 21/20* | (2006.01) | |
| *G01S 7/288* | (2006.01) | |
| *H01Q 1/34* | (2006.01) | |

(52) U.S. Cl.
CPC ...... *G01S 13/0209* (2013.01); *G01S 13/9307* (2013.01); *H01Q 3/26* (2013.01); *H01Q 21/20* (2013.01); *G01S 13/93* (2013.01); *G01S 2007/2883* (2013.01); *G01S 2013/0245* (2013.01); *H01Q 1/34* (2013.01)

(58) Field of Classification Search
CPC ... G01S 7/28; G01S 7/04; G01S 13/02; G01S 13/93; G01S 2007/2883; H01Q 21/205; H01Q 21/20; H01Q 3/26; H01Q 1/34
See application file for complete search history.

(56) References Cited

U.S. PATENT DOCUMENTS

| | | | | |
|---|---|---|---|---|
| 5,028,930 | A * | 7/1991 | Evans | H01Q 3/242 |
| | | | | 342/373 |
| 5,146,230 | A * | 9/1992 | Hules | H01Q 21/29 |
| | | | | 342/372 |
| 5,874,915 | A * | 2/1999 | Lee | H01Q 3/242 |
| | | | | 342/372 |
| 6,011,520 | A * | 1/2000 | Howell | H01Q 13/10 |
| | | | | 343/767 |
| 6,784,838 | B2 * | 8/2004 | Howell | H01Q 3/26 |
| | | | | 342/377 |
| 7,248,210 | B2 * | 7/2007 | Bruce | G01S 7/02 |
| | | | | 342/118 |
| 7,248,215 | B2 * | 7/2007 | Pleva | H01Q 1/3283 |
| | | | | 342/154 |
| 7,315,276 | B1 * | 1/2008 | Rihaczek | G01S 13/426 |
| | | | | 342/108 |
| 7,474,263 | B1 * | 1/2009 | Garfinkle | H01Q 1/28 |
| | | | | 342/372 |
| 7,522,095 | B1 * | 4/2009 | Wasiewicz | G01S 13/424 |
| | | | | 342/160 |
| 7,532,684 | B2 | 5/2009 | Tietjan | |
| RE41,153 | E * | 3/2010 | Mork | G01S 7/003 |
| | | | | 340/945 |
| 7,773,031 | B2 | 8/2010 | Gazelle et al. | |
| 7,944,392 | B2 | 5/2011 | Falk | |
| 8,284,109 | B2 * | 10/2012 | Alberding | G01S 7/032 |
| | | | | 343/700 MS |
| 8,344,943 | B2 * | 1/2013 | Brown | G01S 7/03 |
| | | | | 342/147 |
| 8,416,123 | B1 | 4/2013 | Mitchell et al. | |
| 8,547,275 | B2 * | 10/2013 | Culkin | G01S 13/4463 |
| | | | | 342/153 |
| 8,624,776 | B2 | 1/2014 | Jales et al. | |
| 8,861,588 | B2 | 10/2014 | Nguyen et al. | |
| 8,953,715 | B1 | 2/2015 | Haddadin | |
| 8,988,274 | B2 * | 3/2015 | Zhang | H01Q 21/205 |
| | | | | 342/175 |
| 8,994,589 | B2 | 3/2015 | Marzouki et al. | |
| 9,225,073 | B2 * | 12/2015 | Culkin | G01S 13/4463 |
| 2006/0165198 | A1 | 7/2006 | Tietjan | |
| 2009/0201195 | A1 | 8/2009 | Gazelle et al. | |
| 2009/0295623 | A1 | 12/2009 | Falk | |
| 2011/0102244 | A1 | 5/2011 | Jales et al. | |
| 2011/0285582 | A1 * | 11/2011 | Zhang | G01S 7/024 |
| | | | | 342/26 R |
| 2012/0162012 | A1 | 6/2012 | Marzouki et al. | |
| 2012/0250748 | A1 | 10/2012 | Nguyen et al. | |

OTHER PUBLICATIONS

P. Issogna et al. L-Band High Power Transmit/receive Module for Electronically Scanned Cylindrical Array Radar, IEEE MTT-S International Microwave Symposium Digest, 1993. pp. 497-500. vol. 2. doi: 10.1109/MWSYM.1993.276773.*
Almeroth, Bjoern, et al., "Analyzing the Signal-to-Noise Ratio of Direct Sampling Receivers", *2013 IEEE International Conference on Communications (ICC)*, Budapest, (Jun. 9-13, 2013), pp. 4561-4565.
Blais, Antoine, et al., "Digitization guidelines for a direct sampling dual-band GNSS receiver for civil aviation", *ENC 2011, European Navigation Conference*, London, United Kingdom, (Nov. 2011), pp. 1-9.
Conway, Josh, "Direct Sampling Digital Receiver (DISARMER)", http://www.darpa.mil/program/direct-sampling-digital-receiver, (2013), 2 pp. total.
Fonseca, Nelson J., "Design and Implementation of a Closed Cylindrical BFN-Fed Circular Array Antenna for Multiple-Beam Coverage in Azimuth", *IEEE Transactions on Antennas and Propagation*, vol. 60, No. 2, (Feb. 2012), pp 863-869.
Keller, Catherine M., et al., "Ultra-Wideband Direct Sampling Receiver", *ICUWB 2007 IEEE Conference on Ultra-Wideband*, Singapore, (Sep. 24-26, 2007), pp. 387-392.
Kopp, Bruce A., et al., "Transmit/Receive Module Packaging: Electrical Design Issues", *Johns Hopkins APL Technical Digest*, vol. 20, No. 1, (1999), pp. 70-80.
Koukourlis, C. S., et al., "Design and Development of an Active Printed Cylindrical Antenna Array for Radar Applications", *Proceedings of the XXVIIth URSI General Assembly in Maastricht 2002*, (Aug. 17-Aug. 24, 2002), 4 pp. total.
Lamontagne, Guillaume, et al., "Direct RF Sampling GNSS Receiver Design and Jitter Analysis", *Positioning*, vol. 3, (2012), pp. 46-61.
Mavric, Uros, et al., "Experience with Sampling of 500MHz RF Signal for Digital Receiver Applications", *Proceedings DIPAC 2003*, Mainz, Germany, (2003), pp. 178-180.
McQuiddy, Jr., David N., et al., "Transmit/Receive Module Technology for X-Band Active Array Radar", *Proceedings of the IEEE*, vol. 79, No. 3, (Mar. 1991), pp. 308-340.
Nanda, Rashmi, et al., "A Low-Power Digital Front-end Direct-sampling Receiver for Flexible Radios", *IEEE Asian Solid-State Circuits Conference*, Jeju, Korea, (Nov. 14-16, 2011), pp. 377-380.
Prasad, Surendra, et al., "On the Constrained Synthesis of Array Patterns with Applications of Circular and Arc Arrays", *IEEE Transactions on Antennas and Propagation*, vol. AP-32, No. 7, (Jul. 1984), pp. 725-730.
Rammal, Hussein, et al., "Synthesis of Phased Cylindrical Arc Antenna Arrays", *Internal Journal of Antennas and Propagation*, vol. 2009, Article ID 691625, (2009), 5 pp. total.
Srinivas, G D., et al., "L-Band Direct RF Sampling Receivers", *9th International Radar Symposium India—2013 (IRSI—13)*, NIMHANS Convention Centre, Bangalore India, (Dec. 10-14, 2013), pp. 1-4.
Sureau, Jean-Claude, et al., "Sidelobe Control in Cylindrical Arrays", *IEEE Transactions on Antennas and Propagation*, vol. AP-30, No. 5, (Sep. 1982), pp. 1027-1031.
Syrjala, Ville, et al., "Design Considerations for Direct RF Sampling Receiver in GNSS Environment", *WPNC 2008 5th Workshop on Positioning, Navigation and Communication*, (Mar. 27, 2008), 6 pp. total.
Texas Instruments Incorporated, "Direct RF-Sampling", http://www.ti.com/lsds/ti/data-converters/high-speed-adc-greater-than-1gsps-rf-sampling.page, (Jul. 2011), 2 pp. total.
Epsilon Lambda Electronics Corp, "FMCW Mono-Pulse System Basics", (undated, admitted prior art), 5 pp. total <http://epsilonlambda.com/forum/files/FMCW%20Mono-pulse%20System%20Basic.pdf> accessed Oct. 7, 2016.
"Office Action Dated Apr. 29, 2016; U.S. Appl. No. 14/270,622", (Apr. 29, 2016).

* cited by examiner

MARINE RADAR BASED ON CYLINDRICAL ARRAY ANTENNAS WITH OTHER APPLICATIONS

CROSS-REFERENCE TO RELATED APPLICATIONS

This application is a continuation-in-part of U.S. patent application Ser. No. 14/270,622 filed May 6, 2014.

BACKGROUND OF THE INVENTION

1. Field of the Invention

The present invention relates to the field of marine radar for collision avoidance and navigation at sea, for locating navigation waypoints and hazards, for assessing wave conditions, and for monitoring ship traffic from a shore-based location. Related applications include surveillance of borders, harbors, coastlines, and secure facilities. An extension of the basic design provides surveillance of the airspace.

2. Prior Art

Marine radars commonly employ large mechanically rotating antennas to provide accurate bearing measurements, and also high-power magnetron transmitters to provide high detection sensitivity. As a result, such radars are expensive to operate and maintain.

Some radars designed for other applications employ array antennas that can be electronically steered, avoiding the mechanical rotation mechanism. The modern version of the array antenna has independent transmit and receive capability at each array element. This antenna technology is often called active electronic scanned array (AESA). These arrays are usually constructed on a planar surface.

Monopulse processing commonly refers to the way the antenna is configured to provide multiple receive channels for the measurement of angle. It encompasses both pulsed and continuous frequency modulated waveforms, as well as multiple waveform repetition intervals that are coherently processed to obtain Doppler resolution.

DETAILED DESCRIPTION OF THE PREFERRED EMBODIMENTS

As mentioned before, marine radars commonly employ large mechanically rotating antennas to provide accurate bearing measurements, and also high-power magnetron transmitters to provide high detection sensitivity. As a result, such radars are expensive to operate and maintain. The present invention avoids these on-going expenses by using non-rotating antenna arrays and low-power solid-state electronics.

The present invention makes effective use of conventional radar technology, including an active array antenna utilizing a transmit/receive (T/R) module at each array element, pulse compression for achieving resolution in range, coherent processing for achieving resolution in Doppler, monopulse processing for measuring angles, discrimination of moving from stationary objects, mapping of terrain, tracking of all moving objects, and controlling the display on a computer monitor. Other embodiments, including separate arrays for transmit and receive, and continuous wave embodiments, are also disclosed.

Implementation of Concept

Figure 1A:
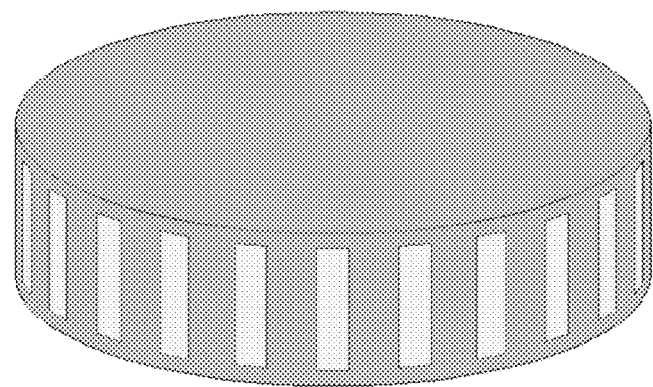
FIG. 1a is a sketch of a preferred embodiment as a cylindrical array.

The cylindrical array antenna is an efficient way to form a narrow beam that can be directed (pointed) anywhere in the azimuth dimension in an arbitrary fashion. An example of such an antenna is sketched in FIG. 1a. The pattern of each array element is broad in the azimuth dimension and relatively narrow in the elevation dimension. A narrow beam is formed in the azimuth dimension by linking several consecutive array elements in a coherent manner. The primary application of a radar based on this antenna is for locating targets on the ground and/or sea surface, and for mapping terrain, since it has no capability to measure the elevation angle. Capability for the latter can be achieved by adding a second layer of receive array elements, as in FIG. 1b. The radar will now be able to locate and track targets in the air and on the ground or sea surface. It also has the potential to assess wave conditions and measure the height of waves.

Figure 1B:
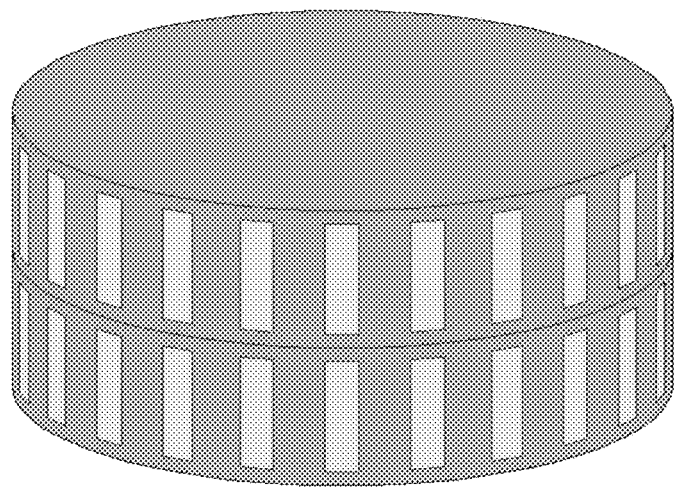
FIG. 1b illustrates an extension of the preferred embodiment with two rows of antenna elements for separation of transmit and receive functions, for measurement of target elevation angle, or with use of continuous waveforms.

Two layers of array elements, as in FIG. 1b, also allow the transmit and receive functions to be separated, to simplify the microwave hardware, to allow more room for components, and to facilitate dissipation of heat.

One way to create the beam is to divide the array into sectors, typically four, where the elements in each sector are fed from a common source on transmit, and to a common receiver. The beam can then be scanned anywhere within a sector by adjusting the phases to tilt the wavefront. Another way to create the beam is to have individual T/R modules at each element, where only a subset is used to create the beam. Although the former method is economical in terms of hardware, it incurs losses in the distribution network, and the beam is degraded as it scans away from its central location. The potential disadvantage of the latter method is the cost of the T/R modules. Nevertheless, this is the preferred embodiment because of its superior performance.

Figure 2:
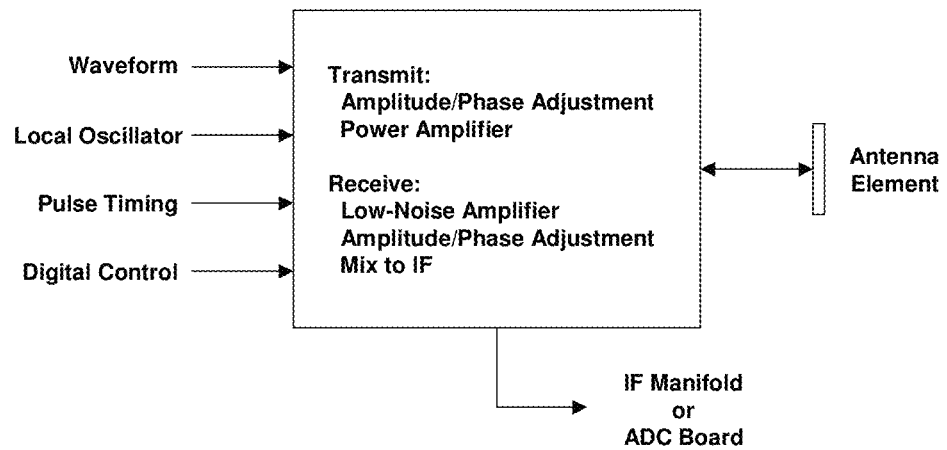
FIG. 2 illustrates a transmit/receive module.
Figure 3:
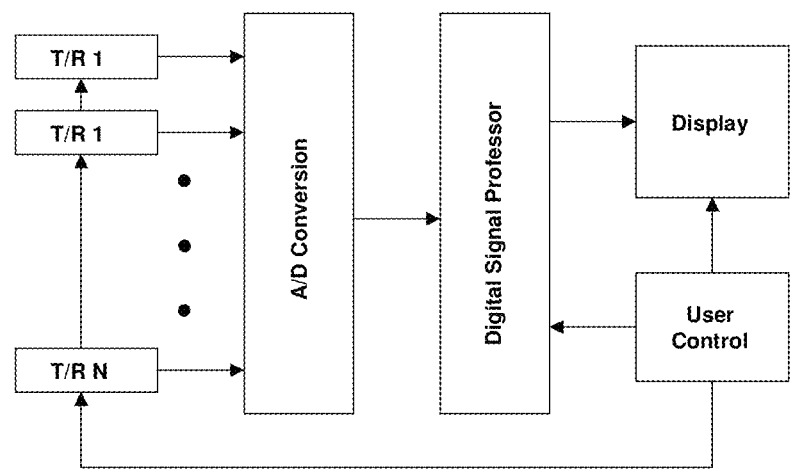
FIG. 3 illustrates analog and digital interfaces.

The array consists of N uniformly spaced elements, where only n of them are active at any given time (n is typically about N/3). As sketched in FIG. 2, the T/R module consists of a power amplifier for transmit and a low-noise amplifier for receive, plus various other microwave and digital components, including an attenuator and phase shifter. The transmit waveform is distributed to all active elements, where adjustments are made in the amplitude and phase to form the beam. For the preferred embodiment on receive, the return at each active array element is down-converted to an intermediate frequency with a mixer and individually digitized. These digitized signals are passed to a digital signal processor, where a doublet or triplet of receive beams is formed, pulse compression and Doppler filtering are implemented, angles are measured in monopulse fashion, and target tracking takes place. The interfaces are shown in FIG. 3.

There are several variations on this preferred embodiment. The transmit and receive components can be in separate layers of the antenna structure. The receive signals at an intermediate frequency can be combined in a manifold prior to analog-to-digital conversion with a single device. They can also be combined at the radar frequency, where the result is down converted with a mixer to an intermediate frequency and analog-to-digital converted with a single device, or down converted to baseband and analog-to-digital converted with two devices. For these variations of the preferred embodiment, only one receive beam is formed in the digital signal processor, which will not have any monopulse measurement capability. These variations also require the ability to adjust the amplitude and phase on receive in the individual T/R modules, in addition to the transmit path. If the individual receive signals are digitized, either directly at the radar frequency, at an intermediate frequency, or at baseband, then the amplitude and phase adjustments can be performed in the digital signal processor, which will provide the monopulse measurement capability.

With separate layers in the antenna structure for the transmit and receive functions, a different number of array elements can be used in each layer, although the preferred embodiment is to have the same number. The diameter of the cylinder can also be different in each layer, although the preferred embodiment is to have the same diameter.

Figure 4:
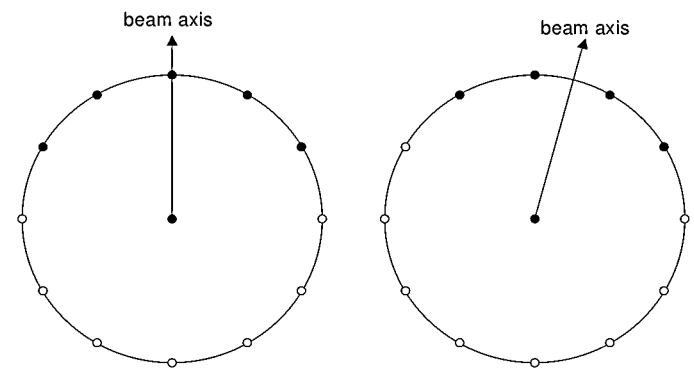
FIG. 4 illustrates array geometry for odd value of n (left) and even value (right) (active elements are shown as solid dots on the outer circle).

The angular spacing of elements is 360°/N, which is also the spacing of beams when the active portion of the array is shifted by one element, and is approximately the half-power width of the beam. In order to accurately measure the target bearing when digitized signals are available from all active T/R modules, beams are also created midway between the above steps. To do this, the preferred embodiment is to add or subtract one of the active elements in the digital process, as shown in FIG. 4, in order to preserve the symmetry in the antenna pattern. The transmit beam and one receive beam are centered at one of the N positions, and other two receive beams are formed at half-step spacings on either side of the center beam. The three receive beams are processed in monopulse fashion to measure the target bearing in the azimuth dimension. The processing of the received beams is in the digital domain after the individual signals have been digitized. The center receive beam can also be eliminated for the monopulse measurement.

The preferred embodiment is to shift the positions of the antenna beams by a half step on alternate scans.

Figure 5:
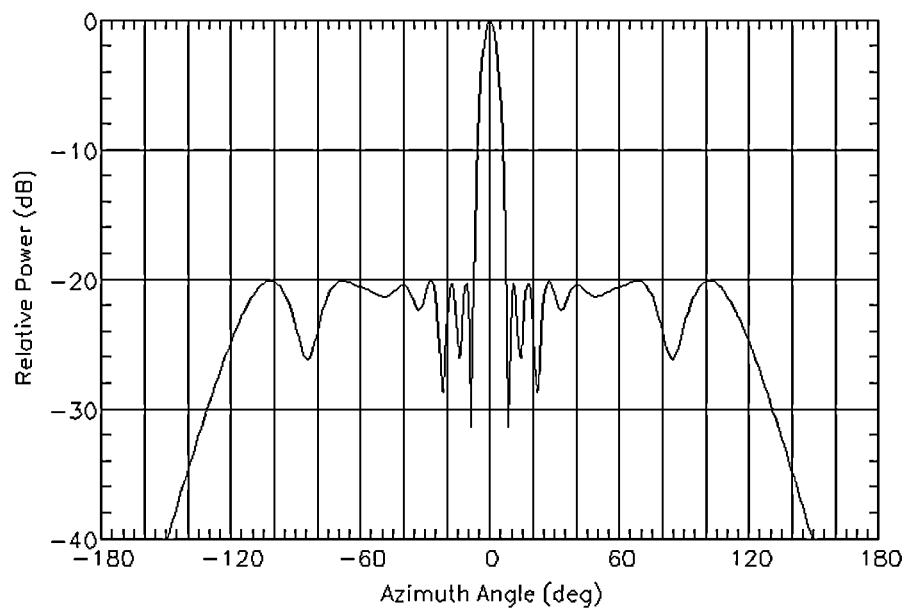
FIG. 5 illustrates the antenna pattern of cylindrical array with 48 elements, 16 of them active, and a diameter of 9.3 wavelengths.

The number of elements about the cylinder, its diameter, and the radar wavelength are design parameters. For example, the antenna pattern in FIG. 5 corresponds to a cylinder diameter of 9.3 wavelengths, N=48, n=16, and amplitude weighting across the array designed to produce nearly uniform sidelobes at the level of −20 dB relative to the peak. The half-power beamwidth is 7.0°. These parameters are scalable to meet specific performance requirements. For example, a small array with a wide beamwidth would be more appropriate for pleasure craft.

The marine radar bands are S-band (about 3 GHz) and X-band (about 9.3 GHz). For the above parameters, the diameter of the cylinder will be about 93 cm at S-band and about 30 cm at X-band, not including a radome. However, the principles described herein apply to all radar bands and also to all values of N and n.

The angle measurement precision (rms) via the monopulse principle is about 14% of the half-power beamwidth on a point target with a signal-to-noise ratio of 13 dB, which is 1° for the beamwidth of 7°. This applies to each measurement, which will improve as the square root of the signal-to-noise ratio and as multiple measurements are smoothed. Increasing the array diameter is the most direct way to improve the precision, but this improvement needs to be balanced with the cost of the additional T/R modules.

Figure 6:
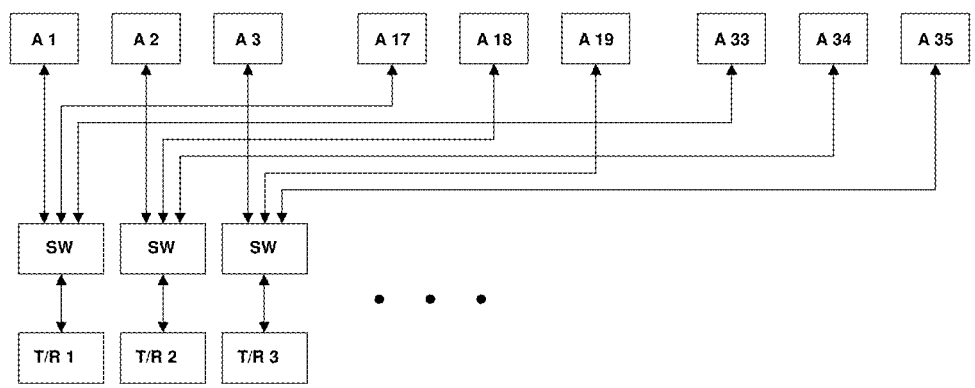
FIG. 6 illustrates the switching scheme.

It is possible to reduce the number of T/R modules to ⅓rd of the total by incorporating a SP3T switch with each device. The switch outputs are connected to three antenna elements, as sketched in FIG. 6 for a total of 48 elements, where the module T/R-1 can be switched to elements #1, #17, and #33, T/R-2 can be switched to elements #2, #18, and #34, T/R-3 can be switched to elements #3, #19, and #35, . . . , and T/R-16 can be switched to elements #16, #32, and #48. For example, to activate elements 21 through 36, the corresponding T/R module sequence would be 5 through 16 and 1 through 4.

Other than the limitation on the number of elements that can be used to form the beam, there are other potential problems with this switching scheme compared to having T/R modules at each antenna element: the switches need to handle substantial power; the coax cables will be longer, which will incur more loss; and the longer cables may be subjected to temperature variation, which may affect phase stability. Low-noise amplifiers could be placed at each element to reduce the receiver noise figure and the effect of temperature variations, but this would also increase the cost. Nevertheless, this patent disclosure covers both configurations.

The above switching scheme can also be used just for the received signals at an intermediate frequency in order to reduce the number of analog-to-digital conversion devices.

It is important to operate solid-state power amplifiers at a relatively high duty ratio. The preferred embodiment is a modulated pulsed waveform, which is used in the following manner. The overall range interval to be processed is divided into zones, where a relatively long pulse is used in each zone. An example of such a schedule is shown in Table 1, which utilizes three zones designed to cover a maximum range of 22.5 km. The long pulse of 90 µs is used in the long-range zone from 13.5 to 22.5 km, corresponding to a delay interval of 90 to 150 µs. Since the receiver has to wait for the entire pulse to be received from the furthest range in that zone, the minimum pulse repetition interval (PRI) is 240 µs. Similarly, a medium pulse of 20 µs is used in the medium-range zone from 3 to 13.5 km, corresponding to a delay interval of 20 to 90 µs. The minimum PRI here is 110 µs. Finally, a short pulse of 0.5 µs is used in the short-range zone from 75 to 3000 meters, corresponding to a delay interval of 0.5 to 20 µs (returns can also be processed within the latter half of the interval eclipsed by the transmit pulse). The minimum PRI in this zone is 20.5 µs.

TABLE 1

Example Schedule of Waveforms

| Zone | Ranges | Delay Interval (µs) | Pulse Length (µs) | PRI (µs) |
| --- | --- | --- | --- | --- |
| Long Range | 13.5-22.5 km | 90-150 | 90 | 240 |
| Medium Range | 3-13.5 km | 20-90 | 20 | 110 |
| Short Range | 75-3000 m | 0.5-20 | 0.5 | 20.5 |

For the same detection performance, the time spent in each of the three zones should be proportional to the fourth power of the maximum range and inversely proportional to the duty ratio. On this basis, the dwell time for the medium-range zone in Table 1 should be 27% of the time in the long-range zone, and 0.5% for the short-range zone. However, detection performance is not the only concern. Performance in clutter is also important, where the length of the coherent processing interval (CPI) determines the Doppler resolution.

In other words, the CPI should be increased in the medium- and short-range zones. The most effective way to do this is to work with several beam positions simultaneously by interleaving pulses among the beams, which is the preferred embodiment. For example, one PRI is processed in position 1, then the next PRI in position 2, and so forth through M positions, then back to position 1, and so forth, until the CPI is completed in all M beam positions. If the CPI is adequate for both detection and clutter performance in the long-range zone, then M should be about 4 for the medium-range zone and 200 for the short-range zone, at least in theory. To simplify the processing, M should not exceed N in the latter zone.

If all beam positions are processed in each scan, the time to complete the scan (the frame time) for the above example will be 48 CPIs for the long ranges, 12 CPIs for the medium ranges, and four CPIs for the short ranges, for a total of 64 CPIs. If the CPI is 50 ms, for example, the time to complete the scan will be 3.2 seconds. The CPI of 50 ms corresponds to a nominal Doppler resolution of 20 Hz, which in turn corresponds to 1.0 m/s at S-band and 0.3 m/s at X-band.

This procedure leads to a very high transmit duty ratio. The duty ratio for the long-range zone is 37.5% (the ratio 90/240), which is being used 75% of the time (the ratio 48/64). The duty ratio for the medium-range zone is 18.2% (the ratio 20/110), which is being used 18.8% of the time (the ratio 12/64). The duty ratio for the short-range zone is 2.4% (the ratio 0.5/20.5), which is being used only 6.3% of the time (the ratio 4/64). The resulting overall average on transmit is 32%. This is very efficient use of the solid-state technology.

The above combination of waveforms is intended an example, which is easily expanded so that longer pulses can be used to cover longer surveillance ranges, and shorter pulses can be used to cover shorter surveillance ranges, all under operator control. The principles described herein apply to all pulse lengths and waveform combinations.

In order to achieve high resolution in range with the long pulses described above, each pulse employs phase or frequency modulation, where the preferred embodiment is linear frequency modulation (linear-FM). The bandwidth of the FM sweep determines the range resolution.

Figure 1C:
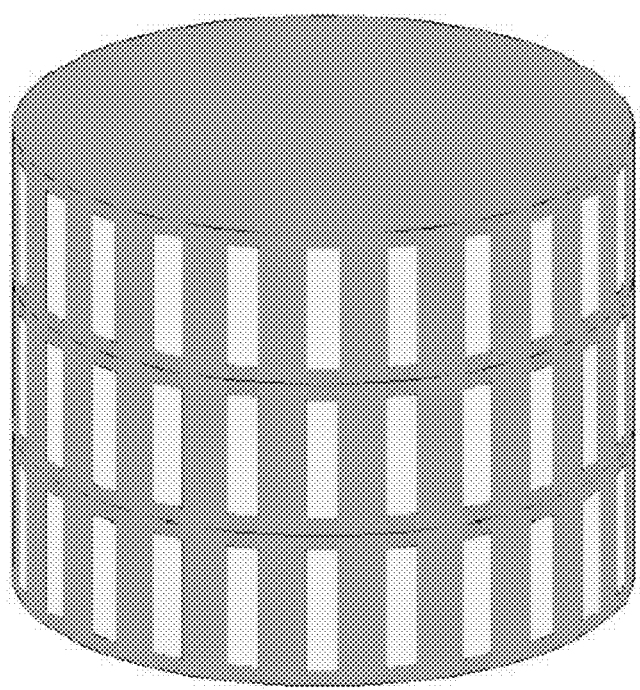
FIG. 1c illustrates an extension of the preferred embodiment with three rows of antenna elements for use with continuous waveforms for measurement of target elevation angle.

Although the preferred embodiment is based on pulsed waveforms, it is also possible to transmit and receive continuously with two layers of antenna elements as in FIG. 1b, one layer for transmit and the other for receive, in order to isolate the signal paths. A third layer would be needed, as in FIG. 1c, if the elevation angle is to be measured. The preferred embodiment for the continuous waveform utilizes frequency modulation, usually called FMCW modulation. The principles described herein apply to both pulsed and continuous waveforms.

Reasonably high resolution in range is needed to provide an accurate mapping of harbors and coastlines. A resolution of about 10 meters is recommended for most applications, which is achieved with the use of pulse compression waveforms. However, the resolution should be under operator control in order to accommodate all potential applications (e.g., low resolution for long-range surveillance and high resolution for short-range surveillance). The principles described herein apply to all resolutions.

Doppler processing is implemented on the coherent sequence of pulses with a bank of filters at each range sample, where the preferred embodiment is via the fast Fourier transform (FFT). Since the radar platform may be moving, the component of this motion in each beam position is compensated (removed) with information provided by an inertial measurement sensor so that returns from the ground and sea will be centered at dc. Returns from any moving object (relative to the ground or sea) will be shifted away from dc, unless its Doppler happens to be an integer multiple of the pulse repetition frequency (PRF). In order to distinguish moving targets from the ground/sea clutter ambiguity, the PRF needs to be changed slightly on alternate frames.

The result of the pulse compression and Doppler processing is a two-dimensional matrix of the illuminated space. The dimensions are range and Doppler. All processed samples are envelope detected to remove the underlying phase. Those envelope-detected samples that are within a preset interval of zero Doppler (after the platform motion has been compensated) are considered to be stationary (relative to the ground or sea). The remaining samples are compared to a pre-determined threshold. Those that exceed the threshold are potential moving targets, which are compared to those already in track. Tracks are updated, and new tracks may be established, subject to the following.

The radar has to be concerned with returns from strong objects at ambiguous ranges that appear at short range (so-called multiple-time-around echoes). The preferred embodiment is to reject all returns that are not coincident in range when the PRF is changed.

The range-Doppler returns that are stationary are also available for display in a background mode for mapping and navigation purposes. Isolated returns that potentially represent navigation waypoints or hazards can also be compared to a threshold and monitored.

The principles described herein can also be tailored to specific scenarios under operator control. For example, more surveillance time can be spent in sectors where the perceived danger is greater, longer CPIs can be used to monitor slower moving objects, and higher resolution can be used to locate smaller objects. Moreover, these modes can be used interchangeably, depending on the beam position.

Figure 1D:
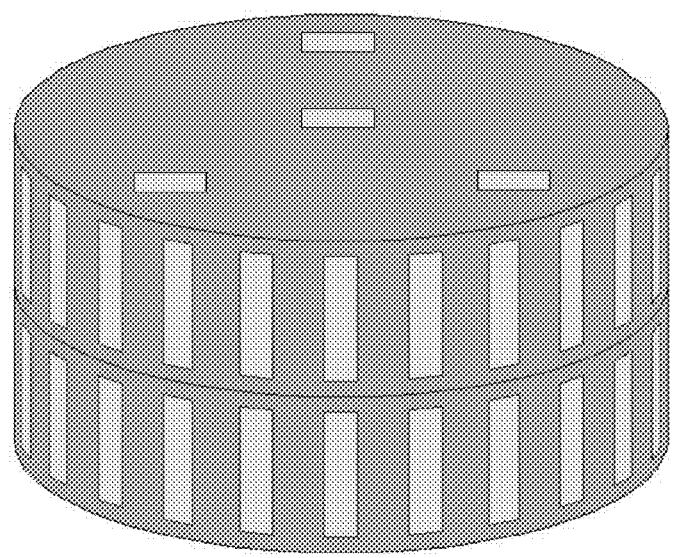
FIG. 1d illustrates an extension of the preferred embodiment in FIG. 1b for complete omni-directional coverage.

The antenna beamwidth in the elevation dimension can be fairly narrow for surveillance of targets on the ground and sea surface, typically no more than about 20°. However, the beamwidth needs to be greater for surveillance of the airspace, but there is a practical limit of about 70° or so. Therefore, configurations shown in FIGS. 1b and 1c will not be able to track targets that are much higher than the elevation beamwidth. The preferred embodiment for tracking these higher targets is to place three or four receive antennas on top of the cylinder to be used as an interferometer, plus one transmit antenna, as illustrated in FIG. 1d. The angle ambiguities of the interferometer are resolved on the basis of the existing tracks. To avoid interference, waveforms in this zenith sector are interleaved with those in the horizontal sectors.

It has been shown that the present invention has a number of aspects, which aspects may be practiced alone or in various combinations or sub-combinations, as desired. While certain preferred embodiments of the present invention have been disclosed and described herein for purposes of illustration and not for purposes of limitation, it will be understood by those skilled in the art that various changes in form and detail may be made therein without departing from the spirit and scope of the invention as defined by the full breadth of the following claims.

What is claimed is:

1. A method of providing and operating a radar system for detecting moving targets comprising:
   providing a cylindrical array antenna with one or more layers of array elements equally spaced around a respective cylinder;
   digitally controlling the array elements to activate a subset of the array elements at any given time;
   generating waveforms that are common to all active transmit array elements, the waveforms having phase or frequency modulation to provide high resolution in range;
   controlling amplitude and phase of the generated waveforms in each active transmit array element in the subset to collectively form and point the respective transmit beam;
   receiving returns from scatterers illuminated by the transmit beam at each active receive array element;
   controlling amplitude and phase of the received returns at the respective active receive array elements, and combining the results to form a receive beam;
   digitizing the combined results to form a digital representation of the radar return in the receive beam;
   processing the digitized radar returns to create a sequence of range samples;
   coherently processing a sequence of digitized radar returns to obtain Doppler resolution represented by a sequence of Doppler samples, repeated in each receive beam for each range sample;
   envelope detecting the range and Doppler samples;
   comparing the envelope detected range and Doppler samples with at least one threshold for detection of the moving targets;
   recording the receive beam positions corresponding to the spacing of the array elements of detected moving targets;
   comparing detected moving targets with previously detected targets already in track,
   check for range ambiguities, and update track files;
   displaying the detected moving targets on a computer monitor;
   displaying received returns from stationary objects in a background mode;
   repeating the above operations for a sequence of beam positions to scan a designated sector; and
   changing a transmit repetition frequency on alternate scans to resolve range and Doppler ambiguities.

2. The method of claim 1 wherein an overall surveillance range is divided into zones with different waveforms used in each zone to increase a transmit duty ratio.

3. The method in claim 1 wherein the coherent processing is via fast Fourier transforms.

4. The method of claim 1 wherein the cylindrical array antenna consists of two layers, one layer for the transmit function and the other layer for the receive function, to at least one of simplify hardware of the radar system, allow more room for components, or facilitate dissipation of heat.

5. The method of claim 1 wherein the cylindrical array antenna consists of two layers, one layer for the transmit function and the other layer for the receive function, and wherein the generated waveforms are continuous waveforms with phase or frequency modulation to provide high resolution in range.

6. The method of claim 1 wherein the cylindrical array antenna consists of two layers, one layer for the transmit function and both layers for the receive function, and wherein the generated waveforms are pulse waveforms with phase or frequency modulation, and further comprising measuring a target elevation angle utilizing a monopulse principle.

7. The method of claim 1 wherein the cylindrical array antenna consists of three layers, one layer for the transmit function and the other two layers for the receive function, and wherein the generated waveforms are continuous waveforms with phase or frequency modulation, and further comprising measuring a target elevation angle.

8. The method of claim 1 wherein separate antenna layers are used for the transmit and receive functions, and wherein the number of array elements in each layer, and the diameter of the cylinders are the same.

9. The method of claim 1 wherein separate antenna layers are used for the transmit and receive functions, and wherein at least one of the number of array elements in each layer, or the diameter of the cylinders, are not the same.

10. The method of claim 1 wherein the received returns of each active receive array element are digitized directly and combined in the digital signal processor to produce the receive beam.

11. The method of claim 1 wherein amplitude and phase adjustments are applied to the received returns of each active receive array element and combined in a manifold and down converted to baseband, then digitized and passed to the digital signal processor.

12. The method of claim 1 wherein amplitude and phase adjustments are applied to the received returns of each active receive array element, down converted to an intermediate frequency and combined in a manifold, then digitized and passed to the digital signal processor.

13. The method of claim 1 wherein the received returns of each active receive array element are down converted to an intermediate frequency, amplitude and phase adjustments are applied and combined in a manifold, digitized and passed to the digital signal processor.

14. The method of claim 1 wherein received returns of each active receive array element are down converted to an intermediate frequency, digitized, and then combined in the digital signal processor to produce the receive beam.

15. The method of claim 1 wherein received returns of each active receive array element are down converted to baseband, digitized, and then combined in the digital signal processor to produce the receive beam.

16. The method of claim 1 wherein a doublet or triplet of receive beams is formed in the digital signal processor, and further comprising measuring target bearing using monopulse processing.

17. The method of claim 1 further comprising adding multiple antennas on top of the cylindrical array antenna, and using the multiple antennas for tracking of targets in a zenith sector via interferometry for targets having an elevation that the method of claim 1 is not able to track.

18. The method of claim 1 wherein the cylindrical array antenna is non-rotating and further comprising monitoring ship traffic.

19. The method of claim 1 wherein the cylindrical array antenna is located on a moveable platform and is non-rotating with respect to that platform, and further comprising compensating the phase of the received returns for platform motion.

20. The method of claim 1 wherein a subset of transmit/receive modules are switched among the array elements.

21. The method in claim 1 further comprising adding or subtracting one active array element to or from the active transmit and receive array elements on alternate scans to form receive beams at half-step spacings on either side of a center receive beam.

22. The method in claim 1 wherein the waveforms are pulse waveforms, and wherein a plurality positions of the transmit and receive beams are processed on alternating pulse waveforms to increase the coherent processing interval for better Doppler resolution.

23. The method of claim 1 wherein the cylindrical array antenna is non-rotating relative to a platform on which it is mounted.

24. The method of claim 23 wherein the platform on which the radar system is mounted on a boat or sea-going vessel, and further comprising navigating and locating hazards with the radar system.

25. The method of claim 24 further comprising and measuring wave height with the radar system.

26. The method of claim 23 wherein the radar system is monitoring ship traffic with the radar system.

27. The method of claim 23 further comprising surveillance of borders, harbors, coastlines, and secure facilities with the radar system.

28. The method of claim 23 further comprising surveillance of airspace with the radar system.

29. The method of claim 23 further comprising monitoring stationary received returns for navigation waypoints or potential hazards.

* * * * *